(12) United States Patent
Ogasawara et al.

(10) Patent No.: US 11,933,520 B2
(45) Date of Patent: Mar. 19, 2024

(54) FLUID-HEATING DEVICE AND MANUFACTURING METHOD THEREOF

(71) Applicant: MARELLI CABIN COMFORT JAPAN CORPORATION, Saitama (JP)

(72) Inventors: Takeshi Ogasawara, Saitama (JP); Naohisa Kamiyama, Saitama (JP); Hiroki Yoshioka, Saitama (JP); Takashi Otsuka, Saitama (JP); Daiju Suzuki, Saitama (JP)

(73) Assignee: MARELLI CABIN COMFORT JAPAN CORPORATION, Saitama (JP)

( * ) Notice: Subject to any disclaimer, the term of this patent is extended or adjusted under 35 U.S.C. 154(b) by 548 days.

(21) Appl. No.: 15/758,166

(22) PCT Filed: Aug. 31, 2016

(86) PCT No.: PCT/JP2016/075427
§ 371 (c)(1),
(2) Date: Mar. 7, 2018

(87) PCT Pub. No.: WO2017/043382
PCT Pub. Date: Mar. 16, 2017

(65) Prior Publication Data
US 2018/0252432 A1    Sep. 6, 2018

(30) Foreign Application Priority Data

Sep. 9, 2015  (JP) .................................. 2015-177703
Sep. 9, 2015  (JP) .................................. 2015-177706
Jul. 13, 2016  (JP) .................................. 2016-138184

(51) Int. Cl.
*B60H 1/22* (2006.01)
*B60H 1/00* (2006.01)
(Continued)

(52) U.S. Cl.
CPC ............. *F24H 1/101* (2013.01); *B60H 1/004* (2013.01); *F24H 1/162* (2013.01); *F24H 9/1827* (2013.01);
(Continued)

(58) Field of Classification Search
CPC ....... B60H 1/004; B60H 1/2225; F24H 1/101; F24H 1/162; F24H 1/201; F24H 9/1827;
(Continued)

(56) References Cited

U.S. PATENT DOCUMENTS 4,238,671 A * 12/1980 Gellert ................ B29C 45/2737
219/544
4,835,365 A * 5/1989 Etheridge .............. H01R 43/00
200/61.52
(Continued)

FOREIGN PATENT DOCUMENTS

EP    0 775 542 A1    5/1997
GB    1173595          12/1969
(Continued)

OTHER PUBLICATIONS

English Translation of JP-11151931-A (Year: 1999).*
(Continued)

*Primary Examiner* — Helena Kosanovic
*Assistant Examiner* — Tiffany T Tran
(74) *Attorney, Agent, or Firm* — FOLEY & LARDNER LLP (57) ABSTRACT

A fluid-heating device for heating fluid with a heater includes: a heating portion that is molded so as to cover the surrounding of the heater; and a support body integrally cast into the heating portion, the heating portion being molded in a state in which the heater is supported by the support body in a die for molding the heating portion.

16 Claims, 6 Drawing Sheets

(51) Int. Cl.
*F24H 1/10* (2022.01)
*F24H 1/16* (2022.01)
*F24H 9/1818* (2022.01)
*H05B 3/06* (2006.01)
*H05B 3/78* (2006.01)
*F24H 1/20* (2022.01)

(52) U.S. Cl.
CPC ............... *H05B 3/06* (2013.01); *H05B 3/78* (2013.01); *B60H 1/2225* (2013.01); *F24H 1/201* (2013.01)

(58) Field of Classification Search
CPC .......... F24H 1/121; F24H 9/2028; F24H 1/20; H05B 3/06; H05B 3/78; H05B 3/42; B22D 19/0072
USPC .......................................................... 392/484
See application file for complete search history.

(56) References Cited

U.S. PATENT DOCUMENTS

| | | | | |
|---|---|---|---|---|
| 5,724,478 A | * | 3/1998 | Thweatt | F24H 1/142 219/535 |
| 6,257,310 B1 | * | 7/2001 | Janko | B22D 19/0072 164/100 |
| 6,460,598 B1 | * | 10/2002 | Adams | H01L 23/473 257/E23.098 |
| 2003/0116180 A1 | * | 6/2003 | Dolechek | F24H 1/162 134/108 |
| 2004/0101293 A1 | * | 5/2004 | Bissonnette | B60S 1/488 392/484 |
| 2004/0261266 A1 | | 12/2004 | Kirby et al. | |
| 2005/0047768 A1 | * | 3/2005 | Kuebler | H05B 3/78 392/493 |
| 2010/0218684 A1 | * | 9/2010 | Etter | A47J 31/542 99/288 |
| 2011/0129205 A1 | * | 6/2011 | Slayton | F24H 1/101 392/488 |
| 2013/0186883 A1 | * | 7/2013 | Watanabe | B60H 1/2221 219/532 |
| 2013/0230302 A1 | | 9/2013 | Kominami et al. | |
| 2015/0054199 A1 | * | 2/2015 | Guenther | B29C 45/2737 264/404 |
| 2015/0129576 A1 | | 5/2015 | Maemura et al. | |
| 2015/0221466 A1 | | 8/2015 | Suzuki et al. | |
| 2016/0334138 A1 | * | 11/2016 | Garber | H05B 3/0014 |
| 2018/0156373 A1 | * | 6/2018 | Sasaki | F16K 27/003 |

FOREIGN PATENT DOCUMENTS

| | | | |
|---|---|---|---|
| JP | H05-66892 U | | 9/1993 |
| JP | 11151931 A | * | 6/1999 |
| JP | H11-151931 A | | 6/1999 |
| JP | 2013-180690 A | | 9/2013 |
| JP | 2013-235759 A | | 11/2013 |
| JP | 2014-053288 A | | 3/2014 |
| WO | WO 2011/086910 A1 | | 7/2011 |

OTHER PUBLICATIONS

EP 0299343 A1 (Year: 1988).*
GB 703662 A (Year: 1950).*
Cast Definition & Meaning—Merriam-Webster (Year: 2006).*

* cited by examiner

FLUID-HEATING DEVICE AND MANUFACTURING METHOD THEREOF

TECHNICAL FIELD

The present invention relates to a fluid-heating device for heating a fluid by a heater and a manufacturing method of the same.

BACKGROUND ART

JP2014-053288A discloses a fluid-heating device that heats a fluid that has been supplied from a supply passage to a tank with a heater and that discharges the heated fluid from a discharge passage.

The helical-shaped heater is provided in the above-described tank. The fluid flowing through the tank is heated by being brought into direct contact with a surface of the heater.

SUMMARY OF INVENTION

However, with the fluid-heating device disclosed in JP2014-053288A, the heater heats the fluid that is in direct contact with the surface thereof. Therefore, there is a risk in that the fluid is locally heated when output of the heater is increased.

An object of the present invention is to provide a fluid-heating device that is capable of efficiently heating a fluid even when an output of a heater is increased and a manufacturing method of the same.

According to one aspect of the present invention, a fluid-heating device for heating fluid with a heater, the fluid-heating device includes: a heating cover portion that is molded so as to cover the surrounding of the heater; and a support body integrally cast into the heating cover portion, the heating cover portion being molded in a state in which the heater is supported by the support body in a die for molding the heating cover portion.

According to another aspect of the present invention, a manufacturing method of a fluid-heating device for heating fluid with a heater, the manufacturing method includes: an installation step of installing the heater in a die with a support body; and a molding step of molding a heating cover portion by filling a molten metal into the die, the heating cover portion being configured to cover a surrounding of the heater, and the heating cover portion being molded such that the support body is integrally cast therein.

According to the above-mentioned aspects, because the fluid-heating device has a configuration in which the heater and the support body are integrally cast into the heating cover portion, the fluid does not come into direct contact with a surface of the heater. With such a configuration, as compared with a case in which the fluid is brought into direct contact with the heater, a heat transfer area for performing a heat exchange with the fluid is ensured sufficiently, and it is possible to suppress local heating of the fluid. Therefore, even when an output of the heater is increased, it is possible to efficiently heat the fluid.

DESCRIPTION OF EMBODIMENTS

A fluid-heating device 100 according to an embodiment of the present invention will be described below with reference to the drawings.

The fluid-heating device 100 is applied to a vehicle air-conditioning device (not shown) mounted on a vehicle such as an EV (Electric Vehicles), an HEV (Hybrid Electric Vehicles), and so forth. The fluid-heating device 100 heats hot water serving as fluid when the vehicle air-conditioning device performs a cabin-heating operation.

An overall configuration of the fluid-heating device 100 will be described first with reference to FIGS. 1 to 3.

Figure 1:
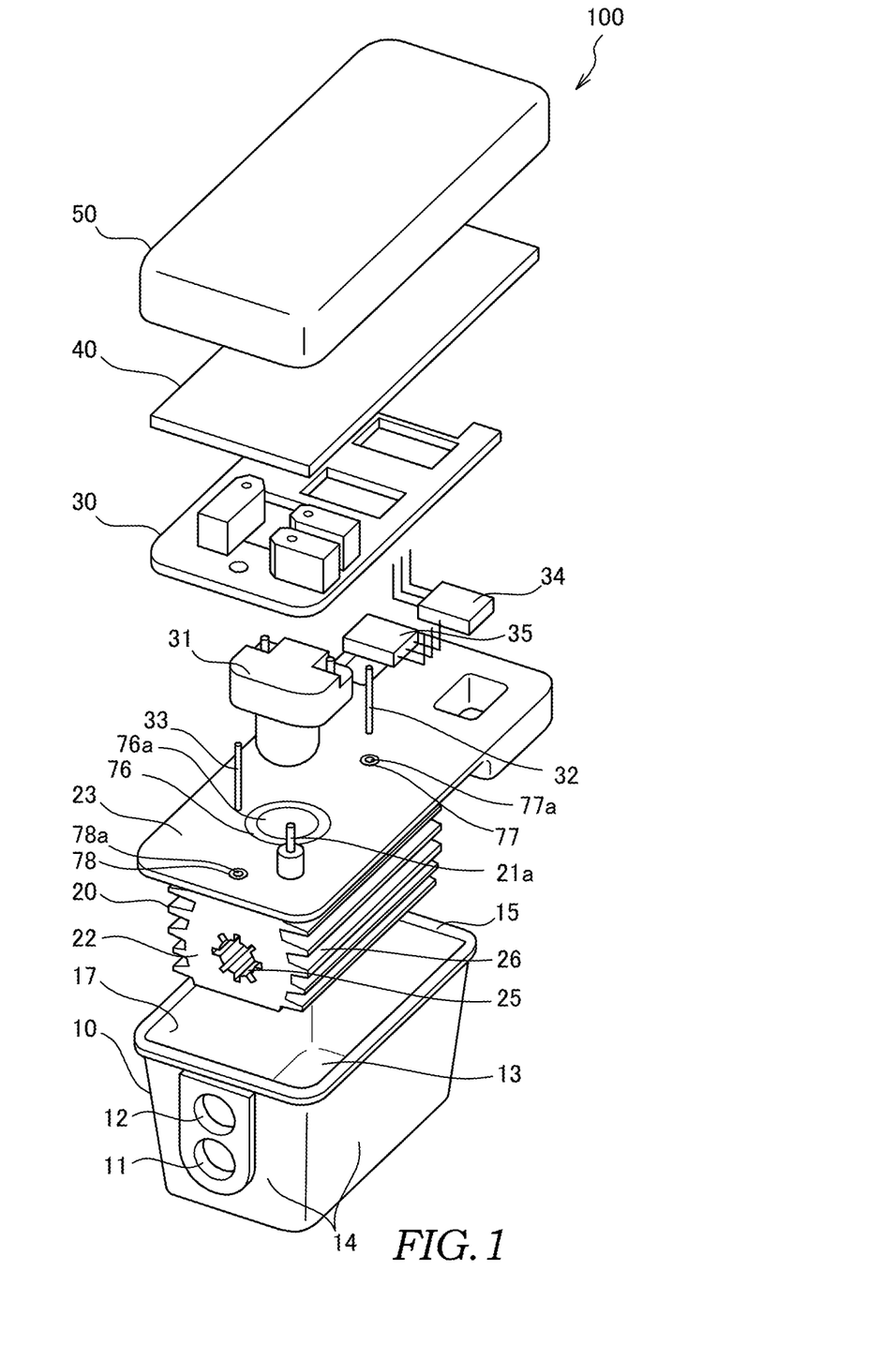
FIG. 1 is an exploded perspective view of a fluid-heating device according to an embodiment of the present invention.

As shown in FIG. 1, the fluid-heating device 100 includes a tank 10 through which water flows, a heater unit 20 that is accommodated in the tank 10, a bus-bar module 30 for connecting various electric components, a control substrate 40 that serves as a control unit for controlling operation of the heater unit 20, and a cover 50 that covers the bus-bar module 30 and the control substrate 40.

The tank 10 is formed to have a substantially cuboid shape. The tank 10 has a rectangular bottom surface 13, four wall surfaces 14 erected from the bottom surface 13, and an opening portion 15 that opens at end portions of the wall surfaces 14 so as to oppose the bottom surface 13. The tank 10 also has a supply port 11 through which the hot water is supplied and a discharge port 12 through which the hot water is discharged. The supply port 11 and the discharge port 12 have openings that are aligned vertically on the same wall surface 14 of the tank 10. The fluid-heating device 100 is disposed in the vehicle such that the discharge port 12 is positioned above the supply port 11 when used.

Figure 2:
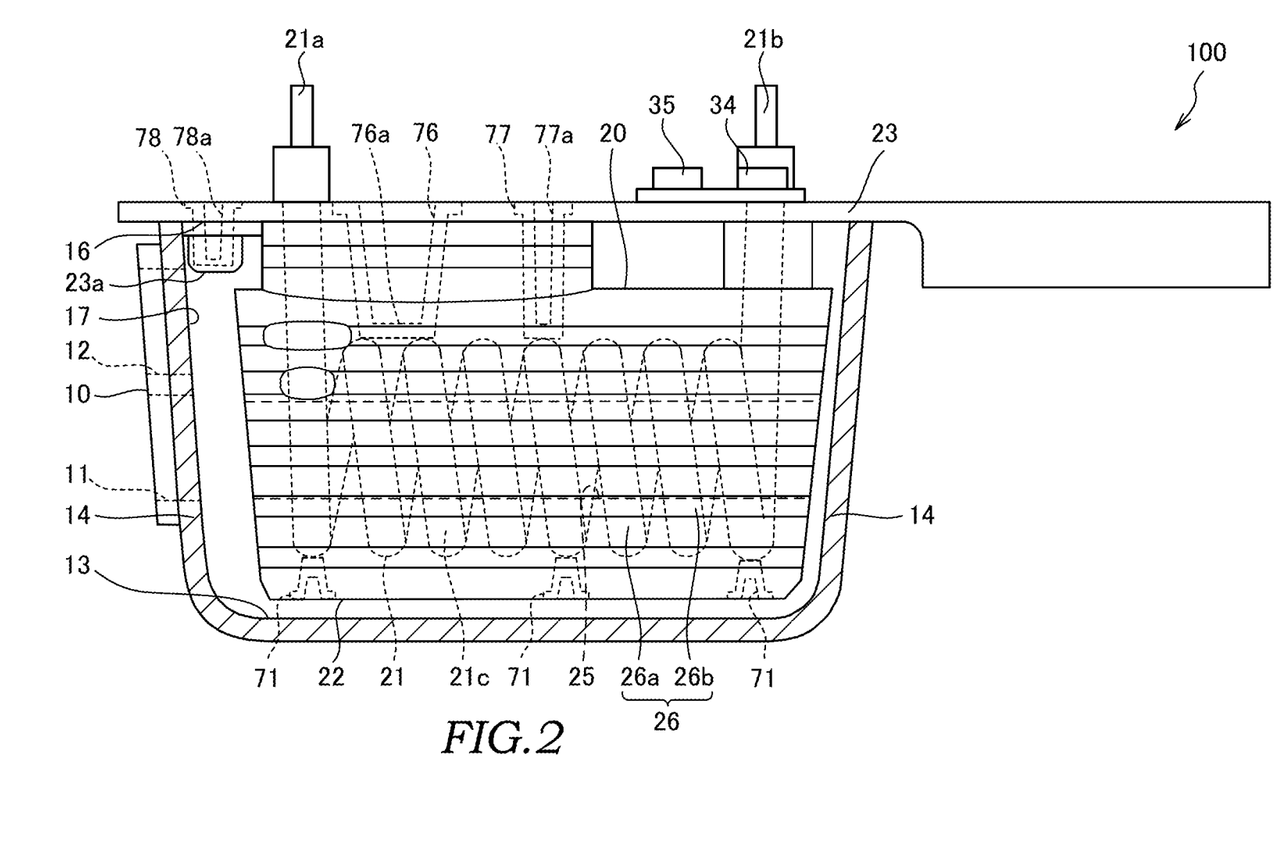
FIG. 2 is a side view of a heater unit and a tank of the fluid-heating device and is a diagram in which the tank is viewed in cross section.
Figure 3:
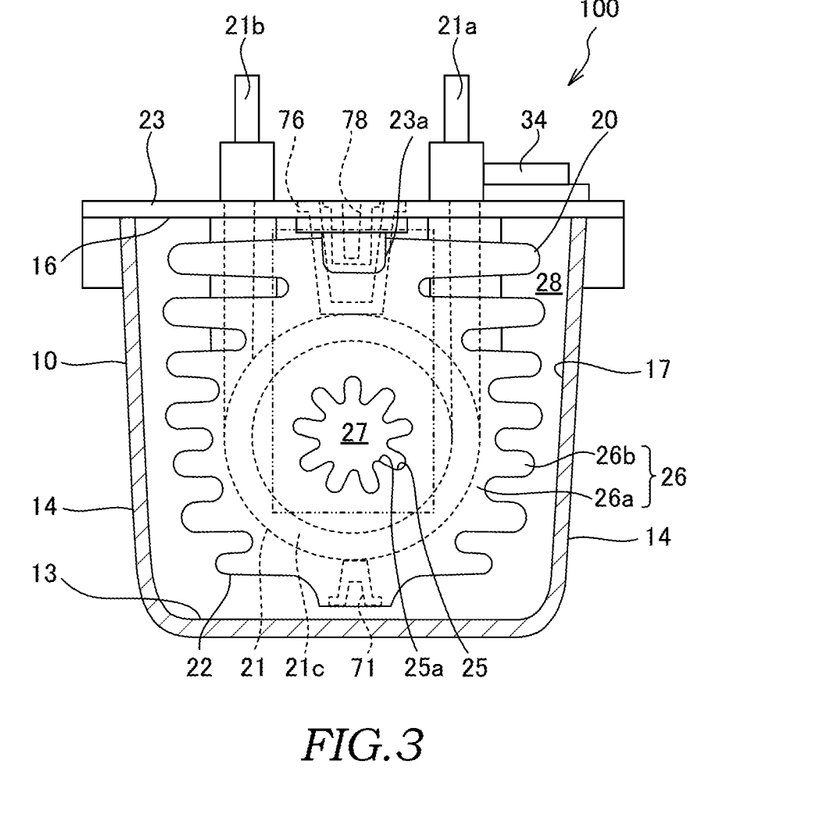
FIG. 3 is a front view of the heater unit and the tank of the fluid-heating device and is a diagram in which the tank is viewed in cross section.

As shown in FIGS. 2 and 3, the heater unit 20 has a heater 21 that generates heat and a heating cover portion 22 that is formed so as to cover the surrounding of the heater 21. In the heater unit 20, the heating cover portion 22 is formed by die-cast molding a metal around the heater 21. The heating cover portion 22 is integrally molded with a top-plate portion 23 that closes the opening portion 15 of the tank 10.

The heater 21 has a helical-shaped heat generating part 21c that is cast into the heating cover portion 22 and a pair of terminals 21a and 21b that project out from the heating cover portion 22. The heater 21 may not have a helical-shape, and for example, may have a heat generating part that is formed so as to extend back and forth in the heating cover portion 22.

In the heater 21, the electrical power is supplied to the pair of terminals 21a and 21b through the bus-bar module 30 from a power unit (not shown) mounted on the vehicle. The heater 21 is a sheathed heater or a PTC (Positive Temperature Coefficient) heater in which the heat generating part 21c generates heat by application of the current. It is preferable to employ the sheathed heater as the heater 21 in terms of costs. Upon receiving an instruction from the control substrate 40, the heater 21 generates heat and heats the hot water flowing through the tank 10.

The heating cover portion 22 has a through hole 25 and a outer-wall portion 26. The through hole 25 is formed so as to have a diameter smaller than that of an inner circumference of the heat generating part 21c, and the through hole 25 penetrates through the heat generating part 21c along the center axis thereof. The outer-wall portion 26 is formed so as to have a diameter larger than that of an outer circumference of the heat generating part 21c, and the outer-wall portion 26 faces inner walls 17 of the tank 10. The heating cover portion 22 is molded of a metal having a lower melting point as compared to the heater 21. In this embodiment, the heater 21 is formed of stainless steel, and the heating cover portion 22 is formed of aluminum alloy.

The through hole 25 is formed in the heat generating part 21c coiled into the helical-shaped. The supply port 11 of the tank 10 opens on the line extending from the through hole 25. The through hole 25 forms an inner circumference flow channel 27 (see FIG. 3) through which the hot water supplied from the supply port 11 flows.

As shown in FIG. 3, the through hole 25 has a plurality of inner circumferential fins 25a that project towards the inner circumference along the flowing direction of the hot water. With the inner circumferential fins 25a, the heat transfer area of the inner-circumferential flow channel 27 is increased as compared to a case in which the inner circumferential fins 25a are not provided. The plurality of inner circumferential fins 25a are formed over the entire circumference of the through hole 25 at equal angle intervals.

An outer circumferential flow channel 28 is formed between the outer-wall portion 26 and the inner walls 17 of the tank 10. The outer circumferential flow channel 28 is continuous with the inner circumference flow channel 27 and the hot water flows therethrough. The outer circumferential flow channel 28 guides the hot water from the inner circumference flow channel 27 to the discharge port 12. The heat transfer area of the outer-wall portion 26 is larger than that of the through hole 25. In addition, the flow channel area of the outer circumferential flow channel 28 is larger than that of the inner-circumferential flow channel 27.

The outer-wall portion 26 has an outer-wall main body 26a formed so as to match with the outer-circumference shape of the heater 21 and a plurality of outer circumferential fins 26b that project towards the outer circumference from the outer-wall main body 26a along the flowing direction of the hot water.

The outer-wall main body 26a is formed so as to cover the outer side of the heat generating part 21c coiled into the helical-shape. Because the outer-wall main body 26a is provided, the heater 21 does not come into direct contact with the hot water.

With the outer circumferential fins 26b, the heat transfer area of the outer circumferential flow channel 28 is increased as compared to a case in which the outer circumferential fins 26b are not provided. The outer circumferential fins 26b are provided so as to extend substantially parallel to the bottom surface 13 of the tank 10 and a top surface 16. The outer circumferential fins 26b are formed such that the size thereof becomes larger towards the top surface 16 relative to the size at a central portion in the height direction of the tank 10. The outer circumferential fins 26b are respectively formed so as to face a pair of opposed wall surfaces 14 of the tank 10 at a predetermined gaps. A lower portion of the outer-wall portion 26 is formed so as to form a predetermined gap with the bottom surface 13 of the tank 10.

As described above, the heater unit 20 has the heating cover portion 22 that is formed so as to cover the surrounding of the heater 21. The heating cover portion 22 has the through hole 25 that is formed so as to have a diameter smaller than that of the inner circumference of the heat generating part 21c and the outer-wall portion 26 that is formed so as to have a diameter larger than that of the outer circumference of the heat generating part 21c. In the heater unit 20, because the surface area of the heating cover portion 22 corresponds to the heat transfer area for performing heat exchange with the hot water, the total surface area of the through hole 25 and the outer-wall portion 26 becomes equal to the heat transfer area. Therefore, as compared to a case in which the heater 21 is brought into direct contact with the hot water, it is possible to increase the heat transfer area for performing the heat exchange with the hot water.

As shown in FIG. 2, the top-plate portion 23 is formed so as to be longer than the opening portion 15 of the tank 10 in the axial direction of the heater unit 20. A part of the top-plate portion 23 extending out from the tank 10 is provided with connectors (not shown) for connecting the fluid-heating device 100 to the power unit, a host controller, and so forth (not shown) mounted on the vehicle.

The top-plate portion 23 is welded to an outer circumference edge of the opening portion 15 in a state in which the heater unit 20 is inserted into the tank 10. The top-plate portion 23 forms the top surface 16 of the tank 10. The top surface 16 opposes the bottom surface 13 of the tank 10 so as to be substantially in parallel therewith.

As shown in FIG. 1, the fluid-heating device 100 includes a bimetal switch 31 and a heater temperature sensor 32 as temperature detectors for detecting temperature of the heater 21. The fluid-heating device 100 also includes a water temperature sensor 33 that detects temperature of the hot water flowing around the heating cover portion 22.

The top-plate portion 23 is provided with a heat-conducting member (support body) 76 for attaching the bimetal switch 31 serving as a temperature switch, a heat-conducting member (support body) 77 for attaching the heater temperature sensor 32, and a heat-conducting member (tube body) 78 for attaching the water temperature sensor 33.

The bimetal switch 31 detects the temperature of the heater unit 20 and is switched in accordance with the detected temperature. Specifically, when the temperature of the heater unit 20 becomes higher than a first set temperature, the bimetal switch 31 interrupts the supply of the electrical power to the heater unit 20. When the temperature of the heater unit 20 becomes lower than a second set temperature that is lower than the first set temperature, the bimetal switch 31 may be switched again such that the supply of the electrical power to the heater unit 20 is restarted.

The heater temperature sensor 32 detects a temperature of the heater 21 of the heater unit 20. The heater temperature sensor 32 sends an electric signal to the control substrate 40 in accordance with the detected temperature of the heater 21. When the temperature of the heater 21 detected by the heater temperature sensor 32 is higher than the set temperature, the control substrate 40 stops supply of the electrical power to the heater 21.

The water temperature sensor 33 detects the temperature of the hot water in the vicinity of the discharge port 12 of the tank 10. In other words, the water temperature sensor 33 detects the temperature of the hot water to be discharged from the tank 10 after the hot water has been heated. The water temperature sensor 33 is provided in a projected portion 23a (see FIGS. 2 and 3) that projects into the tank 10 from the top-plate portion 23. The water temperature sensor 33 sends an electric signal to the control substrate 40 in accordance with the detected temperature of the hot water. The control substrate 40 controls the supply of the electrical power to the heater 21 such that the temperature of the hot water detected by the water temperature sensor 33 becomes a desired temperature.

As shown in FIG. 2, a pair of IGBTs (Insulated Gate Bipolar Transistors) 34 and 35 serving as switching elements are brought into contact with the top-plate portion 23.

The IGBTs 34 and 35 are connected to the power unit of the vehicle via the bus-bar module 30. The IGBTs 34 and 35 are connected to the control substrate 40, and performs switching operation in accordance with an instruction signal from the control substrate 40. The IGBTs 34 and 35 control supply of the electrical power to the heater unit 20 by the switching operation. With such a configuration, a temperature of the heater unit 20 is adjusted to a desired temperature, and thereby, a temperature of the hot water discharged from the discharge port 12 is adjusted to a desired temperature.

The IGBTs 34 and 35 generate heat by repeating the switching operation. The highest temperature at which the IGBTs 34 and 35 can operate is higher than the temperature of the hot water flowing in the tank 10. Thus, the heat of the IGBTs 34 and 35 is released via the top-plate portion 23 to the hot water flowing in the tank 10, and the IGBTs 34 and 35 are cooled.

As shown in FIG. 1, the bus-bar module 30 is layered on top of the top-plate portion 23. The bus-bar module 30 is formed to have a rectangular shape smaller than the top-plate portion 23. The bus-bar module 30 has a conductive connecting member formed of metal plates capable of sending and supplying the electrical power and the electric signals.

The control substrate 40 is layered on top of the bus-bar module 30. The control substrate 40 is formed to have a rectangular shape smaller than the top-plate portion 23. The control substrate 40 is electrically connected to the bus-bar module 30 and the IGBTs 34 and 35. The control substrate 40 controls the IGBTs 34 and 35 on the basis of the instruction from the host controller.

The cover 50 is provided above the control substrate 40. The cover 50 is formed to have substantially the same outer-circumference shape as that of the top-plate portion 23. The cover 50 is welded to an outer circumference edge of the top-plate portion 23. The cover 50 seals an internal space formed between the cover 50 and the top-plate portion 23.

Next, action of the fluid-heating device 100 will be described.

The hot water is supplied from the supply port 11 and is guided to the inner circumference flow channel 27. In the inner circumference flow channel 27, the hot water is heated by the heat exchange with an inner circumference of the through hole 25 at which the inner circumference fins 25a are formed. At this time, the hot water is rectified by the inner circumference fins 25a formed along the flow direction of the hot water.

The hot water that has passed through the inner circumference flow channel 27 is guided to the outer circumferential flow channel 28 after hitting the wall surface 14 of the tank 10 opposing the supply port 11 and changing its flowing direction. The hot water flowing through the outer circumferential flow channel 28 is further heated by the heat exchange with the outer-wall main body 26a and the outer circumferential fins 26b. At this time, the hot water is also rectified by the outer circumferential fins 26b formed along the flow direction of the hot water. The hot water thus heated is then discharged from the discharge port 12.

In this configuration, the flow channel area of the outer circumferential flow channel 28 is larger than that of the inner circumference flow channel 27. Therefore, the flow speed of the hot water in the outer circumferential flow channel 28 is slower than the flow speed of the hot water in the inner circumference flow channel 27. However, the outer-wall portion 26 facing the outer circumferential flow channel 28 has a larger heat transfer area than the through hole 25 forming the inner circumference flow channel 27. Thus, it is possible to make the rate of temperature increase of the hot water in the inner circumference flow channel 27 and the outer circumferential flow channel 28 substantially constant.

The configuration of the fluid-heating device 100 is not limited to that described above, and the hot water supplied from the supply port 11 may be discharged from the discharge port 12 by flowing through the inner circumference flow channel 27 after flowing the outer circumferential flow channel 28.

Next, steps for manufacturing the fluid-heating device 100 will be described with reference to FIGS. 4a to 4c.

Figure 4A:
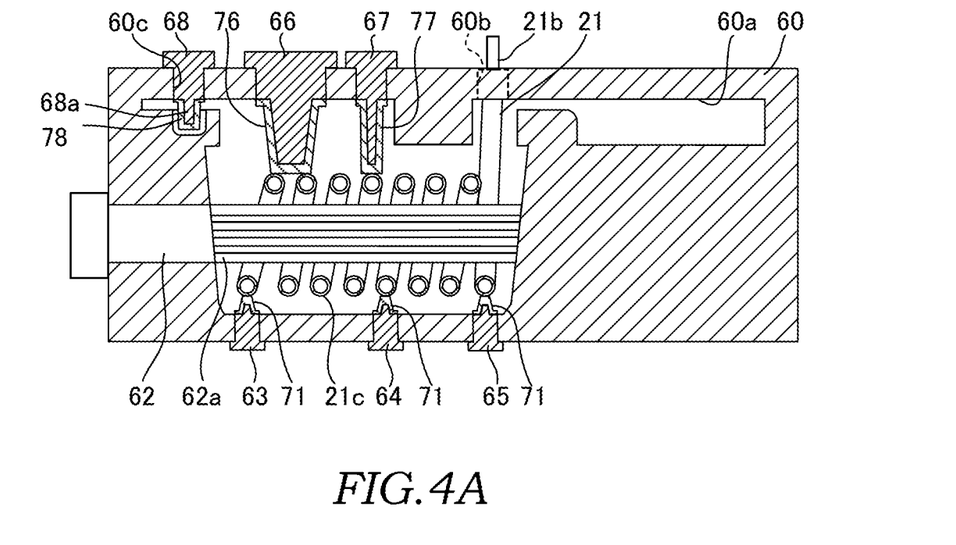
FIG. 4A is a sectional view showing a step for manufacturing the heater unit.
Figure 4B:
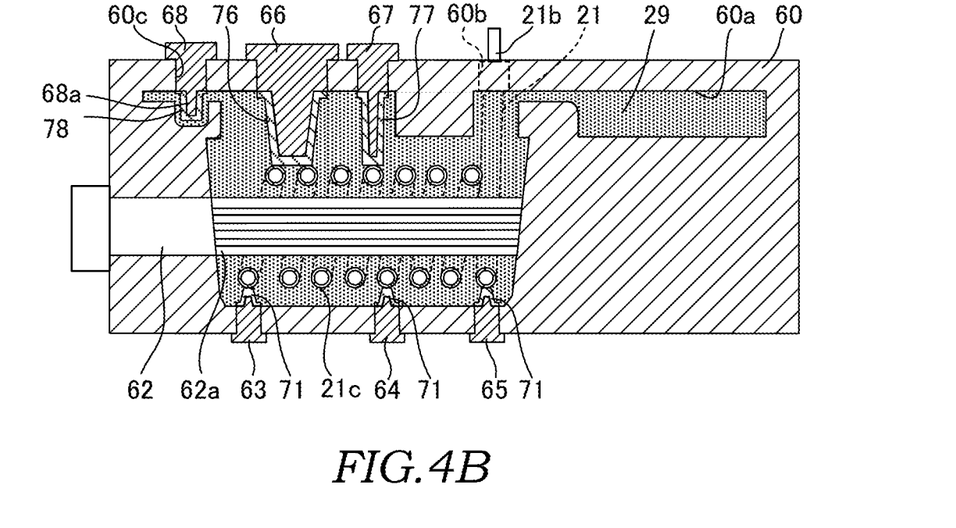
FIG. 4B is a sectional view showing a step for manufacturing the heater unit.
Figure 4C:
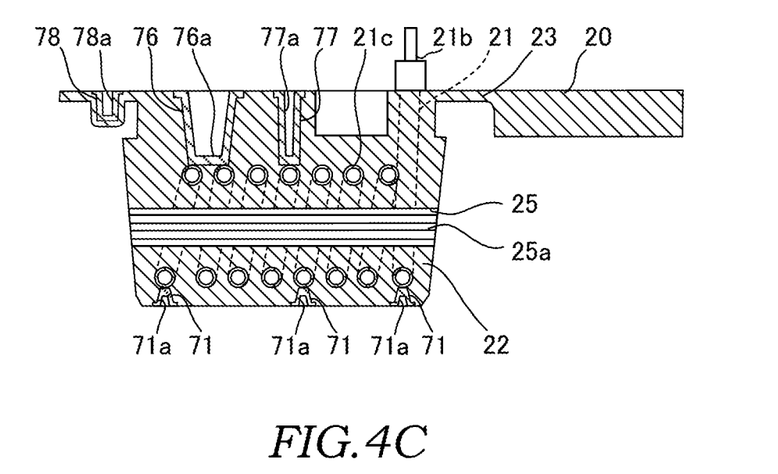
FIG. 4C is a sectional view showing a step for manufacturing the heater unit.

In an installation step shown in FIG. 4a, the heater 21 is installed in the interior of a die 60.

The die 60 has a molding surface 60a with which the contour shapes of the heating cover portion 22 and the top-plate portion 23 are die-cast molded (cast). The die 60 is used in combination with another die (not shown) and a slide die 62 to form a closed space.

In the die 60, pins 63 to 68 are provided as a plurality of jigs that protrude out from the molding surface 60a to support the heater 21.

The pin 68 is formed to have a columnar shape that is fitted to a support hole 60c of the die 60 so as to be capable of moving in and out. A tip-end portion 68a of the pin 68 is formed to have a tapered shape that projects towards the heater 21 from the molding surface 60a. The heat-conducting member 78 having a bottomed tube shape is attached to the tip-end portion 68a of the pin 68 such that they are fitted to each other. Similarly, with the die 60, support bodies 71 and the heat-conducting members 76 and 77, each of which has a bottomed tube shape, are respectively fitted and attached to tip-end portions of the pins 63 to 67. At this time, the heat-conducting members 76 and 77 serve as support bodies that support the heater 21 with respect to the die 60 with the pins 66 and 67.

The pins 66 to 68 project downwards from the molding surface 60a. Each of the pins 63 to 65 projects upwards from the molding surface 60a.

A plurality of (three) support bodies 71 are brought into contact with lower parts of the helical-shaped heat generating part 21c. A plurality of (three) heat-conducting members 76 to 78 are brought into contact with upper parts of the heat generating part 21c. The one terminal 21b is inserted into a hole 60b of the die 60. Similarly, the other terminal 21a is inserted into a hole (not shown) of the die 60. With such a configuration, the heater 21 is installed at a predetermined position in the interior of the die 60.

The surfaces of the support bodies 71 and the heat-conducting members 76 to 78 in contact with the heating cover portion 22 are formed of a metal of the same type as that of the heating cover portion 22, and it is further preferable that the surfaces be formed of a metal having a higher melting point than the heating cover portion 22. In this embodiment, the support bodies 71 and the heat-conducting members 76 to 78 are made of a metal of the same type as that of the heating cover portion 22, and it is further preferable that they are formed of an aluminum alloy having a higher melting point than the heating cover portion 22.

In the die 60, the slide die 62 is inserted into the inside of the heat generating part 21c. The slide die 62 forms a molding surface 62a with which the through hole 25 (the inner circumference fins 25a) of the heating cover portion 22 is molded.

Subsequently, in a molding step shown in FIG. 4b, a molten metal 29 is filled into the interior of the die 60 from a filling port (not shown) of the die 60. In the interior of the die 60, the molten metal 29 is cooled and solidified to form the heating cover portion 22 and the top-plate portion 23.

By forming an external surface of the heater 21 and the surfaces of the support bodies 71 and the heat-conducting members 76 to 78 in contact with the heating cover portion 22 by using the metal having a higher melting point than the heating cover portion 22, it is possible to prevent, in the molding step, the support bodies 71 and the heat-conducting members 76 to 78 and the external surface of the heater 21 from melting by the heat received from the molten metal forming the heating cover portion 22.

Subsequently, in a step shown in FIG. 4c, the pins 63 to 68 are pulled out from the interior of the die 60, and thereafter, the heater unit 20 is removed from the die 60.

In the removed heater unit 20, the support bodies 71 and the heat-conducting members 76 to 78 are cast into the heating cover portion 22, and the terminals 21a and 21b project out from the heating cover portion 22. Holes 71a open in the support bodies 71 by being respectively formed by pulling out the pins 63 to 65. Similarly, holes 76a, 77a, and 78a open in the heat-conducting members 76 to 78 by being respectively formed by pulling out the pins 66 to 68.

Subsequently, in an assembly step, an open end of the tank 10 is welded and fixed to the top-plate portion 23 of the heater unit 20 (see FIGS. 2 and 3).

Furthermore, in the assembly step, the bimetal switch 31, the heater temperature sensor 32, and the water temperature sensor 33 are respectively provided at the heat-conducting members 76 to 78 of the heater unit 20. The bimetal switch 31, the heater temperature sensor 32, and the water temperature sensor 33 are disposed such that their respective outer surfaces are brought into contact (surface contact) with inner surfaces of the holes 76a, 77a, and 78a for the heat-conducting members 76 to 78.

Finally, the bus-bar module 30, the control substrate 40, and the cover 50 are assembled on the heater unit 20.

According to the embodiment mentioned above, the advantages described below are afforded.

The fluid-heating device 100 is configured so as to be provided with: the heating cover portion 22 that is molded so as to cover the surrounding of the heater 21; and the support bodies 71 and the heat-conducting members 76 and 77 serving as support bodies. The support bodies 71 are integrally cast into the heating cover portion 22 by molding the heating cover portion 22 in a state in which the heater 21 is supported by the support bodies 71 in the die 60 for molding the heating cover portion 22.

The manufacturing method of the fluid-heating device 100 includes: the installation step of installing the heater 21 in the die 60 with the support bodies 71 and the heat-conducting members 76 and 77; and the molding step of integrally molding the heating cover portion 22, which covers surrounding of the heater 21, with the support bodies 71 and the heat-conducting members 76 and 77 cast therein by filling a molten metal in the die 60.

According to the above-described configuration, because the heater 21, the support bodies 71, and the heat-conducting members 76 and 77 are cast into the heating cover portion 22, it is possible to prevent a direct contact between the surface of the heater 21 and the hot water. With such a configuration, as compared with a case in which the hot water is brought into direct contact with the heater 21, the heat transfer area for performing the heat exchange with the hot water is sufficiently ensured, and it is possible to suppress the hot water from being heated locally.

With a configuration in which the support bodies 71 and the heat-conducting members 76 and 77 are not cast into the heating cover portion 22, a pin for supporting the heater 21 is inserted to the die 60 for molding the heating cover portion 22, and the pin is pulled out from the molded heating cover portion 22. In this case, a hole formed by pulling out the pin opens to the heater 21 in the heating cover portion 22, and therefore, the hot water is brought into direct contact with the heater 21. Thus, if an output of the heater 21 is increased, there is a risk in that the hot water brought into direct contact with the heater 21 is heated locally.

The fluid-heating device 100 has a configuration in which the hot water flows around the heating cover portion 22 and the support bodies 71.

According to the above-described configuration, because the hot water flows around the heating cover portion 22 and the support bodies 71, a heat transfer region for performing the heat exchange with the hot water is sufficiently ensured, and it is possible to suppress the hot water from being heated locally.

Figure 5:
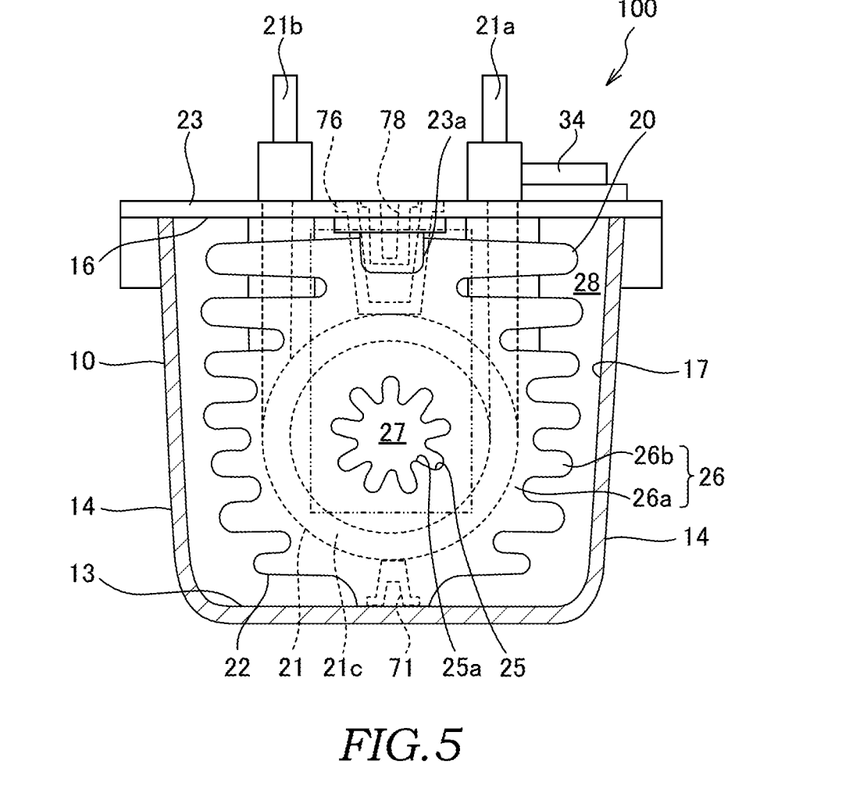
FIG. 5 is a front view of the heater unit and the tank according to a modification of the fluid-heating device and is a diagram in which the tank is viewed in cross section.

The configuration is not limited to that described above, and for example, as shown in FIG. 5, it is possible to have a configuration in which the support bodies 71 are provided so as to come to contact with the bottom surface 13 of the tank 10, and the hot water does not flow around the support bodies 71. In this case, the heating cover portion 22 and a bottom portion of the tank 10 are connected to each other via the support bodies 71. By forming the support bodies 71 with a material having a lower heat conductivity than the heating cover portion 22 or the tank 10, it is possible to suppress the heat of the heater 21 from being transferred to the outside air via the support bodies 71 and the tank 10.

With the fluid-heating device 100 in this embodiment, as compared with the above-described configuration in which the hot water is brought into direct contact with the surface of the heater 21, it is possible to prevent the hot water from boiling even when the output of the heater 21 is increased, and it is possible to increase the efficiency of the heat exchange for heating the hot water with the heater 21.

The heating cover portion 22 is configured so as to be formed of a metal (for example, stainless steel) that is different from a metal (for example, aluminum alloy) forming the external surface of the heater 21.

According to the above-described configuration, it is possible to prevent the external surface of the heater 21 from melting during the step in which the heater 21 is cast into the heating cover portion 22.

At least the surfaces of the support bodies 71 and the heat-conducting members 76 and 77 in contact with the heating cover portion 22 are configured so as to be formed of a metal of the same type as that of the heating cover portion 22.

According to the above-described configuration, when the support bodies 71 and the heat-conducting members 76 and 77 are cast into the heating cover portion 22, the surfaces of the support bodies 71 and the heat-conducting members 76 and 77 are joined with the heating cover portion 22 as both of the metals of the same type are melted. Also in this case, because the support bodies 71 and the heat-conducting members 76 and 77 are provided between the hot water and the heater 21, it is possible to prevent the hot water from being brought into direct contact with the heater 21, and it is possible to prevent the hot water from boiling. Because the support bodies 71 and the heat-conducting members 76 and 77 are brought into close contact with the heating cover portion 22 so as to prevent formation of a gap, it is possible to increase the efficiency of the heat exchange for heating the hot water with the heater 21.

The configuration is not limited to that described above, and it is possible to have a configuration in which the support bodies 71 and the heat-conducting members 76 and 77 are formed of a metal different from that of the heating cover portion 22.

According to the above-described configuration, for example, it is possible to form the support bodies 71 and the heat-conducting members 76 and 77 by mainly using a copper-type metal having a high heat transfer coefficient. Also in this case, because the support bodies 71 are provided between the hot water and the heater 21, it is possible to prevent the hot water from being brought into direct contact with the heater 21, and it is possible to prevent the hot water from boiling. As compared with a case in which the support bodies 71 is formed of an aluminum-type metal, it is possible to increase the efficiency of the heat exchange for heating the hot water with the heater 21 via the support bodies 71 having a high thermal conductivity.

In addition, for example, it may be possible to form the surfaces of the support bodies 71 and the heat-conducting members 76 and 77 by using an aluminum-type metal and to form the main body portions thereof excluding the surfaces by using a copper-type metal having a high heat transfer coefficient. In this case, when the support bodies 71 and the heat-conducting members 76 and 77 are cast into the heating cover portion 22, the surfaces of the support bodies 71 and the heat-conducting members 76 and 77 are joined with the heating cover portion 22 as both of the metals of the same type are melted. It is possible to increase the efficiency of the heat exchange for heating the hot water with the heater 21 via the support bodies 71 mainly formed of a copper-type metal having a high thermal conductivity.

The fluid-heating device 100 is configured so as to be provided with: the heating cover portion 22 that is molded so as to cover the surrounding of the heater 21; the heat-conducting members 76 to 78 that are integrally cast into the heating cover portion 22 when the heating cover portion 22 is molded; and the bimetal switch 31, the heater temperature sensor 32, and the water temperature sensor 33 (temperature detector) that are respectively provided in the heat-conducting members 76 to 78 and detect the temperature of the heater 21, and thereby, the hot water flows through the surrounding of the heating cover portion 22.

The manufacturing method of the fluid-heating device 100 includes: the installation step of installing the heater 21 and the heat-conducting members 76 to 78 to the die 60; the molding step of integrally molding the heating cover portion 22 that covers the surrounding of the heater 21 by filling a molten metal into the die 60 and casting the heat-conducting members 76 to 78 thereinto; and the assembly step of contacting and assembling the bimetal switch 31, the heater temperature sensor 32, and the water temperature sensor 33 (temperature detector) that detect the temperature of the heater 21 to the heat-conducting members 76 to 78 that have been cast into the heating cover portion 22.

According to the above-described configuration, because of the configuration in which the heater 21 is cast into the heating cover portion 22, the hot water flows through the surrounding of the heating cover portion 22. Thus, because the hot water is not brought into direct contact with the surface of the heater 21, as compared with a case in which the hot water is brought into direct contact with the heater 21, the heat transfer area for performing the heat exchange with the hot water is sufficiently ensured, it is possible to suppress the hot water from being heated locally.

With the fluid-heating device 100, the heat of the heater 21 is transferred to the bimetal switch 31, the heater temperature sensor 32, and the water temperature sensor 33 via each of the heat-conducting members 76 to 78 cast into the heating cover portion 22.

The heat-conducting members 76 to 78 are configured so as to have the inner surfaces of the holes 76a, 77a, and 78a serving as contact portions that are brought into surface contact with the bimetal switch 31, the heater temperature sensor 32, and the water temperature sensor 33.

Because the heat-conducting members 76 to 78 are formed separately from the heating cover portion 22, it is possible to make the surface roughness of the inner surfaces of the holes 76a, 77a, and 78a smaller as compared with that of the outer surface of the heating cover portion 22 that has been cast so as to reduce a size of spaces interposed in a heat transfer pathway through which the heat of the heater 21 is transferred. With such a configuration, the heat transfer area (the cross-sectional area of the heat transfer pathway) through which the heat of the heater 21 is transferred is sufficiently ensured for the bimetal switch 31, the heater temperature sensor 32, and the water temperature sensor 33.

In contrast, with a configuration in which the bimetal switch 31, the heater temperature sensor 32, and the water temperature sensor 33 are assembled by being brought into direct contact with the heating cover portion 22, it is not possible to sufficiently ensure the heat transfer area (the cross-sectional area of the heat transfer pathway) through which the heat of the heater 21 is transferred, because of the large surface roughness of the heating cover portion 22 that has been cast. With such a configuration, it is possible to increase the detection accuracy of the bimetal switch 31, the heater temperature sensor 32, and the water temperature sensor 33 for the temperature of the heater 21.

Therefore, it is possible to achieve both efficient heating of the hot water and accurate detection of the temperature of the heater 21 even when the output of the heater 21 is increased.

The fluid-heating device 100 is configured such that the heat-conducting members 76 to 78 cast into the heating cover portion 22 are brought into contact with the heater 21.

According to the above-described configuration, when the heating cover portion 22 is molded using the die 60, the heater 21 is supported at a predetermined position in the die 60 by the heat-conducting member 76. With such a configuration, it is possible to increase the assembly accuracy of the heater 21.

The support bodies 71 and the heat-conducting members 76 to 78 are configured such that at least parts of the surfaces thereof in contact with the heating cover portion 22 are formed of a metal of the same type as that of the heating cover portion 22.

According to the above-described configuration, when the support bodies 71 and the heat-conducting members 76 to 78 are cast into the heating cover portion 22, the surfaces of the support bodies 71 and the heat-conducting members 76 to 78 are joined with the heating cover portion 22 as both of the metals of the same type are melted. Also in this case, because the support bodies 71 are provided between the heater 21 and the hot water, it is possible to prevent the hot water from being brought into direct contact with the heater 21, and it is possible to prevent the hot water from boiling. Because the support bodies 71 and the heating cover portion 22 are in close contact with each other and spaces are prevented from being formed therebetween, it is possible to increase the efficiency of the heat exchange for heating the hot water with the heater 21. Furthermore, because the heat-conducting members 76 to 78 and the heating cover portion 22 are in close contact with each other and spaces are prevented from being formed therebetween, it is possible to increase the detection accuracy of the bimetal switch 31, the heater temperature sensor 32, and the water temperature sensor 33 for the temperature of the heater 21.

The configuration is not limited to that described above, and it is possible to have a configuration in which the support bodies 71 and the heat-conducting members 76 to 78 are formed of a metal different from that of the heating cover portion 22.

According to the above-described configuration, for example, it is possible to form the support bodies 71 and the heat-conducting members 76 to 78 by mainly using a copper-type metal having a high heat transfer coefficient. Also in this case, because the support bodies 71 are provided between the heater 21 and the hot water, it is possible to prevent the hot water from being brought into direct contact with the heater 21, and it is possible to prevent the hot water from boiling. Because the thermal conductivity of the support bodies 71 is increased as compared with a case in which the support bodies 71 and the heat-conducting members 76 to 78 are formed of an aluminum-type metal, it is possible to increase the efficiency of the heat exchange for heating the hot water with the heater 21. Furthermore, because the thermal conductivity of the heat-conducting members 76 to 78 is increased, it is possible to increase the detection accuracy of the bimetal switch 31, the heater temperature sensor 32, and the water temperature sensor 33 for the temperature of the heater 21. It is possible to increase the efficiency of the heat exchange for heating the hot water with the heater 21.

For example, it may be possible to form the surfaces of the support bodies 71 and the heat-conducting members 76 to 78 by using an aluminum-type metal and to form main body portions excluding the surfaces by mainly using a copper-type metal having a high heat transfer coefficient. In this case, when the support bodies 71 and the heat-conducting members 76 to 78 are casted into the heating cover portion 22, the surfaces of the support bodies 71 and the heat-conducting members 76 to 78 are joined with the heating cover portion 22 as both of the metals of the same type are melted. In this case, it is possible to increase the efficiency of the heat exchange for heating the hot water with the heater 21 via the support bodies 71 mainly formed of a copper-type metal having a high thermal conductivity. Furthermore, it is possible to further increase the detection accuracy of the bimetal switch 31, the heater temperature sensor 32, and the water temperature sensor 33 for the temperature of the heater 21 through the heat-conducting members 76 to 78 mainly formed of a copper-type metal having a high thermal conductivity.

According to the above-described configuration, it is possible to cast the heat-conducting members 76 to 78 at any positions with respect to the heating cover portion 22.

The support bodies 71 are configured so as to be supported by the tip-end portions of the pins 63 to 68 capable of moving in and out with respect to the die 60.

According to the above-described configuration, it is possible to cast the support bodies 71 and the heat-conducting members 76 to 78 at any positions with respect to the heating cover portion 22.

According to the above-described configuration, it is possible to cast the support bodies 71 and the heat-conducting members 76 to 78 at any positions with respect to the heating portion 22.

The heat-conducting member 76 is provided between the heater 21 and the bimetal switch 31. The heat of the heater 21 is transferred to the bimetal switch 31 via the bottom portion of the heat-conducting member 76.

The heat-conducting member 77 is provided between the heater 21 and the heater temperature sensor 32. The heat of the heater 21 is transferred to the heater temperature sensor 32 via the bottom portion of the heat-conducting member 77.

The heat-conducting member 78 is covered by the heating cover portion 22. The heat of the hot water flowing through the outer circumferential flow channel 28 is transferred to the water temperature sensor 33 via the heating cover portion 22 and the bottom portion of the heat-conducting member 78. The configuration is not limited thereto, and the bottom portion of the heat-conducting member 78 may be exposed from the heating cover portion 22 to the inside of the tank 10 so as to be exposed to the hot water flowing through the outer circumferential flow channel 28. In this case, the heat of the hot water flowing through the outer circumferential flow channel 28 is transferred to the water temperature sensor 33 via the heat-conducting member 78.

Embodiments of this invention were described above, but the above embodiments are merely examples of applications of this invention, and the technical scope of this invention is not limited to the specific constitutions of the above embodiments.

In the above-mentioned embodiment, the heat-conducting members 76 to 78 cast into the heating cover portion 22 are brought into contact with the heater 21. The configuration is not limited thereto, and it is possible to have a configuration in which the heat-conducting members 76 to 78 cast into the heating cover portion 22 are separated from the heater 21 and parts of the heating cover portion 22 are interposed between the heat-conducting members 76 to 78 and the heater 21. In this case, the heat of the heater 21 is transferred to the bimetal switch 31, the heater temperature sensor 32, and the water temperature sensor 33 via the heating cover portion 22 and each of the heat-conducting members 76 to 78.

This application claims priority based on Japanese Patent Application No. 2015-177703 filed with the Japan Patent Office on Sep. 9, 2015, Japanese Patent Application No. 2015-177706 filed with the Japan Patent Office on Sep. 9, 2015, and Japanese Patent Application No. 2016-138184 filed with the Japan Patent Office on Jul. 13, 2016, the entire contents of which are incorporated into this specification.

The invention claimed is:

1. A fluid-heating device for heating fluid with an electrically-powered heater having a helical-shaped heat generating part, the fluid-heating device comprising:
a heating cover portion that is molded so as to cover the surrounding of the electrically-powered heater, the heating cover portion includes an outer wall portion configured to perform heat exchange with the heating fluid, the heater being integrally die-cast molded into the heating cover portion; and a support body integrally cast into the heating cover portion while supporting the helical-shaped heat generating part, the heating cover portion being integrally die-cast molded using a die in which the heater is supported by the support body, the support body including a first side and a second side opposite the first side, the first side contacting the helical-shaped heat generating part, and the second side including a pin hole extending into the second side, the second side being configured to perform heat exchange with the heating fluid.

2. The fluid-heating device according to claim 1, wherein the heating cover portion and the support body are configured such that the fluid flows around the heating cover portion and the support body.

3. The fluid-heating device according to claim 1, wherein the heating cover portion is formed of a metal different from a metal forming an external surface of the heater.

4. The fluid-heating device according to claim 1, wherein at least a surface of the support body in contact with the heating cover portion is formed of a metal of a same type as that of the heating cover portion.

5. The fluid-heating device according to claim 1, wherein the support body is formed of a metal different from that of the heating cover portion.

6. The fluid-heating device according to claim 1, comprising:

a heat-conducting member that is integrally cast into the heating cover portion when the heating cover portion is molded; and a temperature detector provided in the heat-conducting member, the temperature detector being configured to detect temperature of the heater.

7. The fluid-heating device according to claim 6, wherein the heat-conducting member is brought into contact with the heater.

8. The fluid-heating device according to claim 6, wherein the heat-conducting member has a contact portion that is in surface contact with the temperature detector.

9. The fluid-heating device according to claim 6, wherein at least a surface of the heat-conducting member in contact with the heating cover portion is formed of a metal of a same type as that of the heating cover portion.

10. The fluid-heating device according to claim 6, wherein the heat-conducting member is formed of a metal different from that of the heating cover portion.

11. The fluid-heating device according to claim 1, wherein the support body includes a plurality of support bodies, respectively positioned spaced apart from one another along a longitudinal axis of the fluid-heating device and contact the helical-shaped heat generating part from the first side.

12. The fluid-heating device according to claim 11, wherein the outer wall portion having a main body and a plurality of outer circumferential fins projecting outward from the main body.

13. The fluid-heating device according to claim 12, wherein the heating cover portion further includes a through hole extending through a circumferential center relative to the helical-shaped heat generating part.

14. A fluid-heating device for heating fluid with an electrically-powered heater, the fluid-heating device comprising:

the electrically-powered heater including a helical-shaped heat generating part;

a heating cover portion configured to surround the heater, the heating cover portion includes an outer wall portion configured to perform heat exchange with the heating fluid; and a support body configured to support the helical-shaped heat generating part, wherein the heater and the support body are integrally die-cast molded east into the heating cover portion while the support body supports the helical-shaped heat generating part, the support body contacting the helical-shaped heat generating part on a first side of the support body, and having a pin hole extending into a second side of the support body opposite to the first side, the second side being configured to perform heat exchange with the heating fluid.

15. The fluid-heating device according to claim 14, wherein the support body includes a plurality of support bodies, respectively positioned spaced apart from one another along a longitudinal axis of the fluid-heating device and contact the helical-shaped heat generating part from the first side.

16. The fluid-heating device according to claim 15, wherein the outer wall portion having a main body and a plurality of outer circumferential fins projecting outward from the main body.

* * * * *